United States Patent Office 3,504,210
Patented Mar. 31, 1970

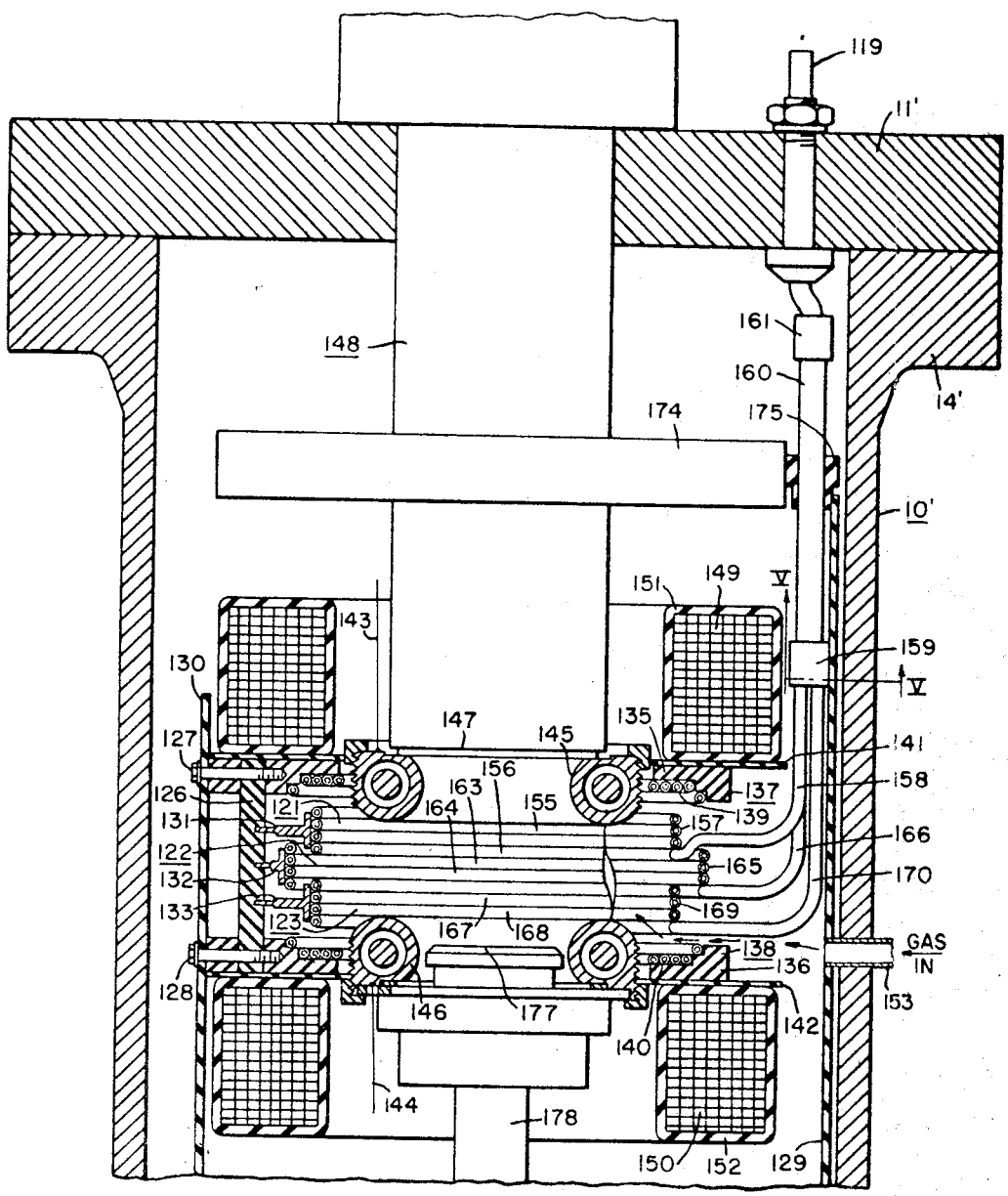

3,504,210
WATER-COOLED ARC HEATER APPARATUS AND HEAT SHIELD FOR USE THEREIN
Armin M. Bruning, Export, and Charles E. LeRow, Jr., Irwin, Pa., assignors to Westinghouse Electric Corporation, Pittsburgh, Pa., a corporation of Pennsylvania
Continuation-in-part of application Ser. No. 340,220, Jan. 27, 1964. This application Apr. 17, 1967, Ser. No. 631,456
Int. Cl. H01j *1/02, 7/24*
U.S. Cl. 313—19                                22 Claims

ABSTRACT OF THE DISCLOSURE

An arc heater has two spaced annular electrodes with a magnetic field coil near each electrode, the coils being energized in a manner to set up a magnetic field which causes the arc to rotate substantially continuously. Heat shield means comprising coils of conduit composed of a material having high thermal conductivity, through which a cooling fluid flows, prevents direct radiation from the arc between electrodes from falling on any insulating material or any metallic surface which is not fluid cooled. The heat shield means comprises a plurality of discrete sections spaced from each other and electrically insulated from each other. Fluid inlet and fluid outlet means for each section have hydraulic insulators therein. Any current path through the heat shield sections between electrodes has a much higher resistance for arc current than an arc current path directly between electrodes. In addition, the substantial voltage drop which would occur when an arc strikes a cold surface in effect additionally discourages the arc from striking to one or more heat shield sections.

---

This application is a continuation-in-part of application Ser. No. 340,220, filed Jan. 27, 1964, and now abandoned, by the same title and assigned to the same assignee.

FIELD OF THE INVENTION

This invention relates to improvements in arc chambers for increasing the enthalpy of a gas, and more particularly to water cooled arc chambers having heat shields forming the wall of the chamber, and protecting the walls of the tank or housing, as well as the supporting structure, from the heat of radiation of the electric arc and to some extent from the heat of convection of the heated gas.

In a generator for hypersonic testing where an electric arc is used for heating and expanding the gas, extremely high power input levels are desirable. In fact, most applications call for power input levels of an order which heats the gas to temperatures far above the melting point of usable materials. For this reason it becomes necessary to cool materials in the immediate vicinity of the arc.

DESCRIPTION OF THE PRIOR ART

Prior art practice is, generally stated, to enclose the space or arc chamber between the two electrodes by a heat shield which may be cylindrical in shape and which is composed of a highly heat resistant material. Such a prior art structure is exemplified in Patent No. 3,048,736, issued Aug. 7, 1962, to W. S. Emmerich for "Arc Chamber"; and Patent No. 3,078,383, issued Feb. 19, 1963, to H. J. Lingal for "Arc Chamber." The prior art includes multi-electrode devices having the electrodes separated by insulating material which is exposed to direct radiation from the arc or arcs and to heat of convection and conduction. Examples are found in Patent No. 3,140,421, issued July 7, 1964, to R. M. Spongberg for "Multiphase Thermal Arc Jet"; Patent No. 3,171,060, issued Feb. 23, 1965, to G. P. Wood et al. for "Plasma Accelerator"; and Patent No. 3,149,222, issued Sept. 15, 1964, to G. M. Giannini et al. for "Electrical Plasma Jet Apparatus and Method Incorporating Multiple Electrodes."

It was realized by prior art inventors that insulating materials when heated beyond a certain temperature by convection or conduction, and/or when exposed to direct radiation from an arc were degraded and suffered a reduction if not a total loss of their insulating properties. In attempting to overcome this, the prior art approach was to attempt, without success, to find a better insulating material which would eliminate the problem. Patent No. 2,964,678, issued Dec. 13, 1960, to J. W. Reid for "Arc Plasma Generator" uses graphite. The aforementioned patent to Spongberg prefers Teflon. Wood et al. prefers boron nitride. Patent No. 3,182,176, issued May 4, 1965, to E. A. Bunt et al. exposes quartz to direct radiation from the arc. Patent No. 3,201,560, issued Aug. 17, 1965, to R. F. Mayo et al. for "Electric Arc Heater" exposes a ceramic to direct radiation from the arc.

Another material employed in the prior art was a ceramic having a compound of zirconium as an ingredient thereof.

Even after the desirability of some fluid cooling had occurred to some prior art inventors, they were unable to devise structures without some insulating material being exposed to direct arc radiation and to heat of convection and conduction. Patent No. 3,073,984, issued Jan. 15, 1963, to R. C. Eschenbach et al. for "Toroidal Arc Apparatus" has a fluid cooled electrode but nevertheless exposes a lengthy insulating member 76 to direct radiation, heat of convection and conduction. A Patent No. 3,146,371, issued Aug. 25, 1964, to J. H. McGinn for "Arc Plasma Generator" uses fluid cooling of a portion of the means enclosing the arc chamber, but nevertheless exposes vortex rings 50 composed of alumina quartz to direct radiation from the arc, to heat of convection and conduction.

When we made our invention, there was a need for arc heaters of greater arc power, higher enthalpies, and higher gas temperatures. The trend was unmistakable then and has continued since. We faced squarely the fact that there is no known insulating material which would eliminate the problem; this is especially true for arc heaters employing an inert gas or a reducing atmosphere. We realized that the need for greater arc powers, higher gas temperatures and higher enthalpies would aggravate and increase the problem, and we therefore realized that the solution lay elsewhere; we realized and discovered that the true solution lay in devising an arc heater in which only fluid cooled surfaces were exposed to direct radiation from the arc, and we are the first to conceive of such a solution to the problem, and the first to devise a fluid cooled heat shield composed of discrete sections electrically insulated from each other, and which would offer an arc current path of greater resistance than an arc current path directly between electrodes.

SUMMARY OF THE INVENTION

Our invention overcomes the limitations and disadvantages of the prior art. In one embodiment we replace the ceramic cylindrical heat shield of the prior art with a heat shield formed by a water coil assembly comprising a plurality of coils each consisting of one or two turns of copper tubing, all of the turns of each coil being of substantially the same diameter in some embodiments, and each coil being spaced from and electrically insulated from the coils on both sides thereof, preferably each of the coils being somewhat greater in diameter than the diameter of the electrodes of the arc chamber. The coil assembly is long enough to overlap the inner portions of both electrodes, that is, the portions which face each other.

Each coil is connected by electrical and hydraulic insulating means to a common water header or water inlet for a water input, and to an additional common water header or water outlet. The fact that each coil or group of coils is individually insulated from adjacent coils or groups on both sides thereof and is properly spaced from the nearest electrode and properly spaced from adjacent coils insures that the electric arc will not follow a path through the coils, and will not inadvertently strike to the coils, but will be confined to an arc path directly between the electrodes. Additionally, there is a voltage drop when an arc strikes a cold surface, further discouraging the arc from taking a path through the coils. In one embodiment we provide a conduit having a wall shaped to form a groove on one side of each turn and shaped to form a tongue on the other side of each turn. Each electrode has disposed therearound and spaced therefrom an electrode ring assembly with a ring somewhat greater in inner diameter than the outer diameter of the electrode itself, the ring assembly including, and being cooled by, a coiled copper tube of a plurality of turns and carrying water, disposed on the face of the ring which receives direct radiation from the arc. The heat shield or shields are so designed that the electrical impedance between electrodes due to the multiple air gaps in a path by way of the coils and ring assemblies is substantially greater than the impedance of a path directly between electrodes. Also, the coil or coils are floating with reference to electrode potential. The heat shields, together with the ring assemblies, are dimensioned and located so that arc radiation in the main electrode area and that straying from the main electrode area directly impinges only upon a water cooled surface, and does not reach a group of tie bars composed of fiber or other suitable material and supporting the water cooled heat shield and the electrode ring assemblies. Hydraulic insulators, which may be composed of glass epoxy, are in both inlet and outlet lines to maintain the cooling tubes at a desired potential with respect to the electrodes. Liners composed of a laminated plastic, for example, a laminated phenolic, protect the cooling tubes from the tank shield which is at ground potential. They also help to support and locate the heat shields.

Another embodiment provides a heat shield of three coil portions which overlap axially, one of the coil portions being of a different diameter than that of the other two portions.

Accordingly, a primary object of our invention is to provide new and improved arc heater apparatus having improvements over any now existing in the art.

Another object is to provide new and improved arc heater apparatus having a fluid cooled heat shield forming the wall of the arc chamber and interposed between the arc and the wall of the pressure tank enclosing the chamber whereby direct radiation from the arc falls only on a fluid cooled surface.

Still a further object is to provide a new and improved heat shield for use in an arc chamber.

An additional object is to provide a new and improved heat shield for use in an arc chamber and composed of a plurality of water carrying copper tubes in the form of coils, each coil or group of coils being insulated electrically from adjacent coils or groups to discourage the formation of an arc path through the coils.

These and other objects will become more clearly apparent after a study of the following specification when read in connection with the accompanying drawings, in which:

BRIEF DESCRIPTION OF THE DRAWINGS

FIG. 3 is a cross-sectional view through an arc chamber according to an additional embodiment of our invention;

DESCRIPTION OF THE PREFERRED EMBODIMENTS

Figure 1:
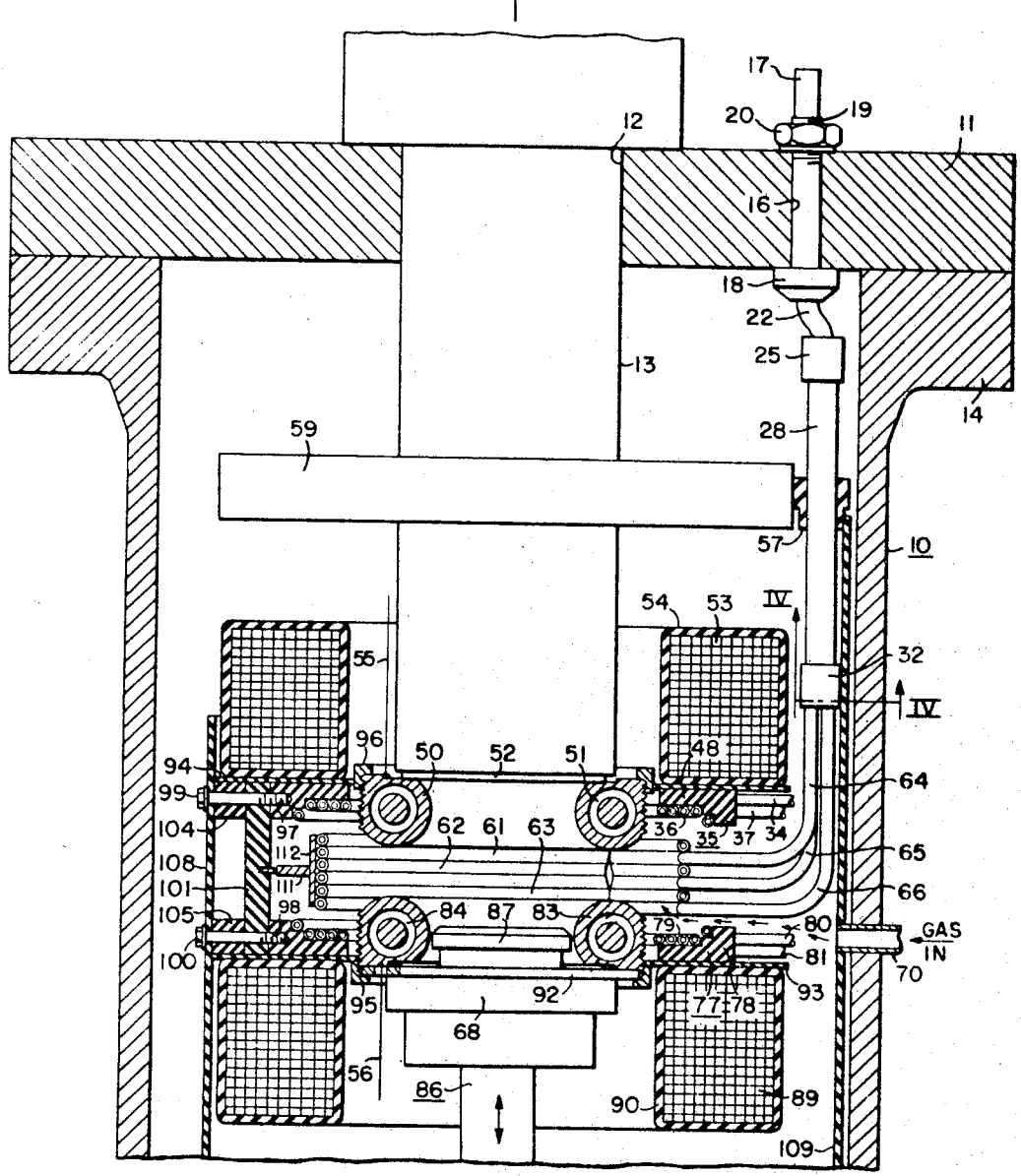
FIGURE 1 is a cross-sectional view through an arc chamber according to one embodiment of our invention.
Figure 2:
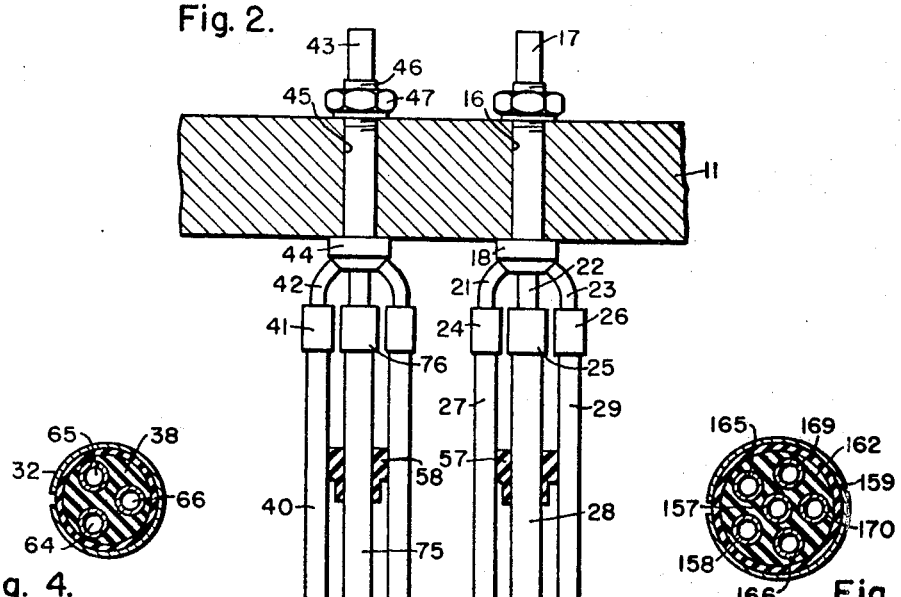
FIG. 2 is a plan view of the apparatus of FIG. 1.

Referring now to the drawings, in which like reference numerals are used throughout to designate like parts, for a more detailed understanding of the invention, and in particular to FIG. 1 thereof, there is shown an arc chamber having a tank or pressure vessel generally designated 10 with a top cover plate 11 having a substantially central aperture 12 through which passes a nozzle generally designated 13. The cylindrical pressure tank 10 is seen to have a flange portion 14 snugly abutting against the cover plate 11 and secured thereto by any convenient means not shown, such as bolts, passing through aligned bores, not shown in the flange and the end cover plate. The cover plate 11 may have suitable O-rings, not shown, in suitable grooves therein for providing a tight sealing engagement with the flange. The end plate 11 has an additional aperture or bore 16 therethrough through which passes a water inlet 17 having a flanged portion 18 on the inside thereof and having a threaded end 19 on the outside thereof with a nut 20 for holding the inlet 17 securely in place. The inlet 17 on the inside of the pressure chamber branches out into a triple exit having conduits 21, 22 and 23, FIG. 2, each connected by way of a rubber hose connection 24, 25 and 26 to a hydraulic insulator 27, 28 and 29, respectively. In FIG. 1, conduit portion 21, hose connection 24, hydraulic insulator 27, and hose connection 31 are all omitted for clarity of illustration. It is seen, FIG. 2, that each of the hydraulic insulators 27, 28 and 29 terminates at the other (or lower) end thereof in a rubber hose and clamp, these being hose clamps 31, 32 and 33, respectively. Hydraulic insulator 29 and hose connection 33 are connected to conduit 34 which may be the inlet conduit for bringing cooling fluid to the pancake wound cooling coil 36 of the top electrode ring assembly 35. Conduit portion 34 may be an integral end portion of the copper tubing forming coil 36. Water exits from the top electrode ring cooling coil 36 by way of conduit portion 37 which it is seen, FIG. 2, is connected by way of a rubber hose and clamp connection 39, hydraulic insulator 40, and rubber hose connection 41 to a conduit portion 42 of a fluid outlet generally designated 43 having an inner flange portion 44 and passing through an additional bore 45 in the cover plate 11, the fluid outlet 43 having a threaded outer end 46 with nut 47 for holding the outlet in place. It is seen, FIG. 1, that the cooling coil 36 is mounted on the aforementioned ring member 48, which may be composed of metal or of insulating material. The ring 48 is part of the upper electrode ring assembly 35 and is seen to have an inner diameter somewhat greater than the outer diameter of the adjacent electrode 50. The electrode 50 is ring or "doughnut" shaped and has a spiral passageway 51 therein for providing for the flow of a cooling fluid, such as water, throughout the electrode to conduct heat therefrom. The electrode itself may be composed of copper or other material having a high heat conductivity, and it will be understood that suitable water inlet and outlet passageways, not shown for convenience of illustration, communicate with the spiral passageway 51 for bringing water to and conducting water from the electrode 50. It is seen that closely adjacent the ring-shaped or doughnut-shaped electrode 50 is the entrance end 52 of the aforementioned nozzle 13. Disposed adjacent the electrode 50 and ring assembly 35 is a field coil 53 enclosed in a housing 54 composed of insulating material. Leads, not shown for convenience of illustration, are connected to the coil 53 for supplying an energizing potential of the desired polarity and magnitude thereto, to set up a magnetic field in the arc chamber for purposes to be made hereinafter more clearly apparent, but it may be stated here that the magnetic field energy may be imparted to the gas to assist in increasing the enthalpy thereof, or the magnetic field may be used to continuously move the arc over the faces of the electrodes, or both.

In FIG. 1, the coils comprising the heat shield are seen to consist of three coils of copper tube 61, 62 and 63, having coil or conduit portions 64, 65 and 66 connected at the aforementioned rubber hose clamp connection 32 to the hydraulic insulator 28 and thence by hose connection 25 to the aforementioned portion 22 of inlet 17.

Figures 4, 5:
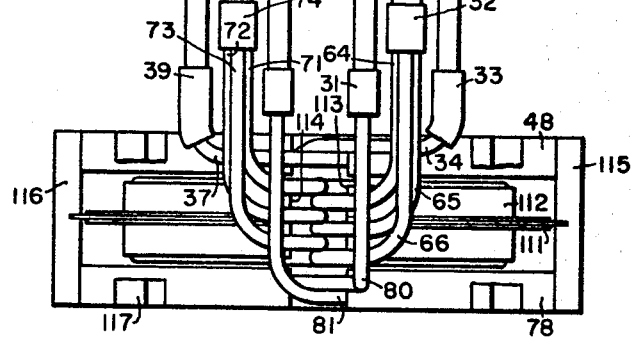
FIG. 4 is a detailed cross-section along the line IV—IV of FIG. 1.
FIG. 5 is a detailed cross-section along the line V—V of FIG. 3.

Particular reference is made now to FIG. 4, a detailed cross-section through hose connection 32. A connector 38 which in this embodiment may be rubber or metal, of the same diameter as the hydraulic insulator, has spaced bores therethrough for receiving conduit portions 64, 65 and 66. Connector 38 is held adjacent the end of the hydraulic insulator by the rubber hose and clamp.

In FIG. 2, the aforementioned coils 61, 62 and 63 are seen to have exit conduit portions 71, 72 and 73 connected by way of hose clamp connection 74, hydraulic insulator 75 and hose clamp connection 76 to one conduit portion of the outlet 43. The connection at 74 may be similar to that at 32 shown in FIG. 4.

Spacers 57 and 58, which are composed of insulating material, are provided for the inlet and outlet hydraulic insulators. Spacers 57 and 58 may be secured to a support member 59 mounted on the nozzle 13, FIG. 1.

Referring again in particular to FIG. 1, it is seen that the bottom electrode ring assembly 77 comprises a shaped ring 78 of metal or insulating material having mounted thereon a pancake coil 79 of copper tubing with an inlet conduit portion 80 and an outlet conduit portion 81. The aforementioned ring 78 is seen to have an inner diameter somewhat larger than the outer diameter of the other electrode 83, which is ring-shaped or doughnut-shaped and has a spiral passageway 84 therein for conducting cooling fluid through the electrode, which is preferably composed of copper or some other material having a high heat conductivity. Inlet conduit means and outlet conduit means, not shown for convenience of illustration, are provided for bringing cooling fluid to the spiral passageway 84 of electrode 83 and conducting fluid therefrom. Air or other gas enters the arc chamber, which is referred to herein as the space or area between the electrodes 83 and 50, by way of the spaces between the coils of the heat shield and the upper and lower ring assemblies.

Inside electrode 83 is a movable annular member 87 the outer edge of which almost touches the inner edge of electrode 83. Member 87 is at least partially composed of conductive material, is slidably mounted in support member 68 having annular flange 92 maintained secured to electrode 83 by threaded clamp ring 95 engaging threads in electrode 83. Member 87 is also operatively attached to movable rod 86 and is moved upward to make contact with electrode 50 to start the arc. The member 87 is then drawn back to the position shown and the arc transfers its path to electrode 83. Members 87, 68 and 92 are entirely or partially composed of conductive or insulating material as required to provide operation in the desired or conventional manner. After member 87 has withdrawn to the position shown somewhat below the upper face of electrode 83 and after the arc has transferred from member 87 to the electrode 83, member 87 should become neutral or "floating" to inhibit the arc from thereafter striking from electrode 50 to member 87. Apparatus previously known in the art can accomplish this. Rod 86 may extend through a bore, not shown, in the lower cover plate, not shown.

The ring 78 and electrode 83 are seen to have disposed adjacent thereto an additional field coil 89 having a housing 90 composed of insulating material. Lead means, not shown for convenience of illustration, is provided for the coil 89 for bringing an energizing potential of suitable polarity and amplitude thereto for setting up a field of the desired magnitude and direction. If desired, coils 53 and 89 may be so energized that their fields oppose each other rather than add with the result that there is a strong component of the magnetic field in a substantially horizontal direction, FIG. 1, and transverse to the direction of the arc striking between the electrodes 50 and 83.

If desired, coils 53 and 89 may be energized to set up a rotating field which will cause the arc to move continuously over the electrodes to prevent burning a hole or holes in the electrodes.

The lower electrode assembly is seen to include an additional annular ring supporting member 93 composed of insulating material. This supporting member 93 may assist in supporting both the electrode ring assembly 77 and the field coil housing 90, if desired, which may be secured thereto by any convenient means, not shown. A similar supporting ring member 94 is provided on the other side of the arc chamber between the field coil housing 54 and the ring 48. The internally threaded annular ring clamp members 95 and 96 are provided as shown engaging external threads on portions of electrodes 83 and 50 and holding the electrodes in place. Ring support members 93 and 94 are seen to extend to tank liner 108, FIG. 1, and to abut against the tank liner. Electrodes 50 and 83 are insulated from rings 48 and 78, and are insulated from the coils of copper tubing by air gaps.

At the left side of the electrode and coil assembly, FIG. 1, it is seen that the rings 48 and 78 have threaded bores 97 and 98 therein, in which are disposed the threaded ends of two bolts 99 and 100 which also pass through bores in a tie bar 101 composed of insulating material, and which pass through aligned bores in a pair of bosses or bushings 104 and 105. The aforementioned bolts 99 and 100 also pass through bores or apertures in an insulating supporting member or tank liner 108. Bolts 99 and 100 are preferably composed of fiber or glass. An additional portion of the tank liner is shown at 109. Portions 108 and 109 of the tank liner are both arcuate shaped and may cover or extend approximately 90 degrees. Portion 108 has at least two tie bars secured thereto for supporting the coil and electrode structure. The tie bars may total eight, at spaced intervals around cylindrical support 112, three additional tie bars being shown at 115, 116, and 117, FIG. 2. Some of the tie bars may be unsupported. In a recess or aperture in the aforementioned tie bar member 101 is disposed and secured a section of the flange portion 111 of the aforementioned cylindrical supporting member 112, the annular flange portion 111 extending in a radial direction, the portion 112 and flange 111 being composed of metal in the embodiment of FIG. 1 and supporting the coil or coils of copper tubing which form the heat shield. The turns of coils 61, 62, and 63 may be brazed to support member 112. It is seen from a close examination of FIG. 1 that there is no "line of sight" between the arc path between electrode 50 and electrode 83 and any portion of the tie bar 101, this straight path or line of sight path being blocked by the turns of the aforementioned coils 61, 62 and 63. In like manner no direct radiation can reach the ring member 48 from the arc by reason of the coil 36 and no direct radiation can reach the ring member 78 by reason of the coil 79 of copper tubing, so that all direct radiation from the arc between electrodes 50 and 83 impinges upon a water cooled surface. The aforementioned ring-shaped member 112 may extend almost the entire way around the perimeter of the coils with a break at 113 and 114 as shown in FIG. 2 for the passage of the inlet and outlet conduit portions to the coils of the heat shield.

Leads 55 and 56 provide circuit means for bringing an arc-producing current to electrodes 50 and 83 respectively. A bushing 70 passing through the wall 10 of the tank and through liner member 109 brings gas to be heated into the arc chamber, the gas following the path indicated by the arrows.

Figure 6:
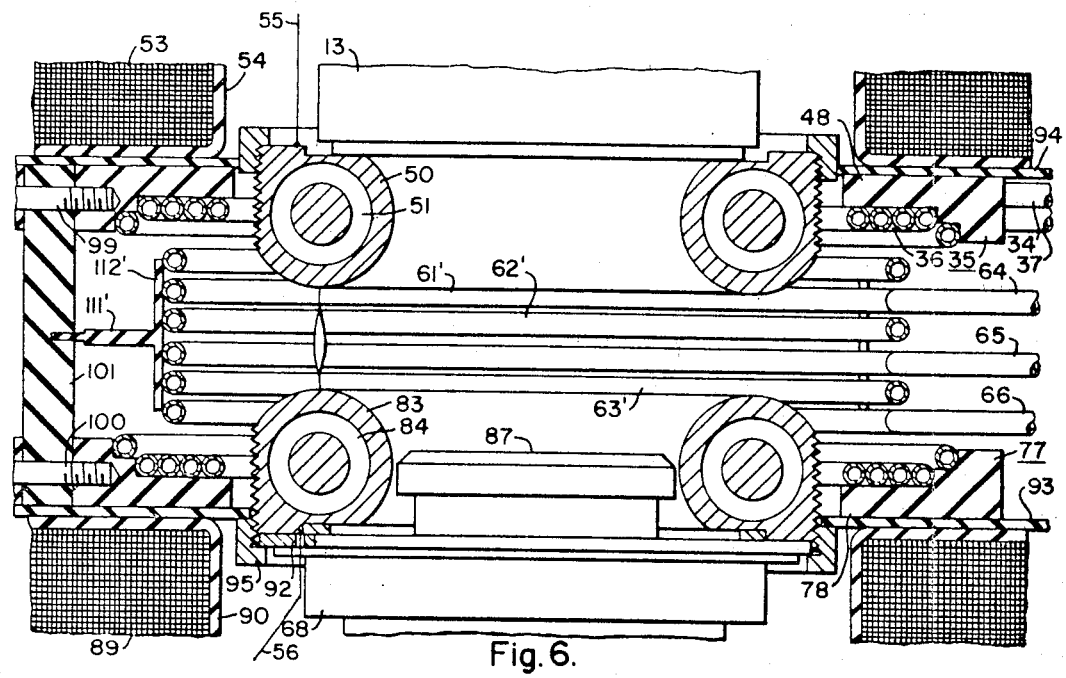
FIG. 6 is a cross-sectional view of apparatus similar to FIG. 1, to a larger scale, and showing spaced coils.

Particular reference is made now to FIG. 6 showing an additional embodiment similar to that of FIG. 1, but in which there is spacing between turns of a coil, and the coils 61', 62' and 63' are supported by electrically insulating support member 112' with flange 111'. Spacing and electrically insulating the coils results in an arc path of increased impedance through the coils. A connector 38' composed of insulating material is employed to maintain the electrical insulation between coils.

In FIG. 2, as modified to conform to the embodiment of FIG. 6, it is understood that all coils and conduit portions entering the break between edges 113 and 114 in support member 112 are spaced from each other to maintain electrical insulation.

Particular reference is made now to FIG. 3, in which an additional and preferred embodiment of our invention is shown. In FIG. 3, instead of using one group of three coils of the same diameter to form the heat shield, there are three portions or sections of the heat shield, each consisting of two coils. One section of the heat shield is generally designated 121, one section is generally designated 122, and the third section of the heat shield is generally designated 123. The heat shield coil assembly generally designated 121 is supported by a cylindrical support member 131 having the annular flange portion thereof extending into a groove in a tie bar 126 composed of insulating material; the coil portion 122 has a cylindrical support member 132 with the annular flange portion thereof extending into the tie bar 126, and the coil portion 123 is supported by a cylindrical support member 133 having the flange portion thereof in a groove in the aforementioned tie bar 126. Support members 131, 132 and 133 are metal, and the coils may be brazed thereto. The tie bar 126 is seen to extend in both directions (upward and downward) a considerable distance beyond the limits of the outer coils of the coil portions 121 and 123, and to be secured by insulating bolts 127 and 128 to the tank liner 130. The rings 135 and 136 are parts of a pair of ring assemblies respectively generally designated 137 and 138, each of the ring assemblies including a "pancake" coil of hollow copper tubing; these coils 139 and 140, it is understood, are connected by suitable conduits, not shown for convenience of illustration, suitable rubber hose and clamp couplings and suitable hydraulic insulators, not shown, to water inlet and water outlets, one of these being shown at 119. The ring assembly 137 has adjacent thereto an annular flange or support member 141 composed of insulating material, and the ring assembly 138 has annular supporting member 142 composed of insulating material. It is seen that electrodes 145 and 146 are disposed in the position shown with respect to the ring assemblies 137 and 138, these electrodes being "doughnut" shaped and having spiral passageways therethrough for the passage of the cooling liquid. Electrode 145 has the end 147 of a nozzle generally designated 148 adjacent thereto. Field coils 149 and 150 in insulating housings 151 and 152 respectively are located adjacent or near the electrodes 145 and 146 respectively. Leads 143 and 144 are connected to electrodes 145 and 146 respectively for bringing an arc-producing current thereto.

The entire apparatus is disposed in a chamber formed by pressure tank generally designated 10' with end or upper cover plate 11', the flange 14' abutting against the end plate 11'. The tank can be integral with one cover plate. Bushing 153 passing through the wall 10' of the chamber and liner 129 admits gas to be heated to the arcing region.

The tank liner of the embodiment of FIG. 3 may be generally similar to the liner of FIG. 1, and may include aforementioned liner portion 130, arcuate shaped, and liner portion 129.

Each of the heat shield sections is seen to consist of two coils of two turns each, the coils of the heat shield portion generally designated 121 being designated 155 and 156 and having conduit portions 157 and 158 for bringing fluid to the coils. The connection of conduit 157 to a hydraulic insulator and thence to a water inlet or outlet is omitted for clarity of illustration, but the conduit 158 is seen connected by way of rubber hose clamp 159, hydraulic insulator 160 and rubber hose clamp 161 to the aforementioned water inlet or outlet 119. The coils of heat shield portion generally designated 122 are designated 163 and 164, having conduits 165 and 166, conduit 166 being shown connected at the aforementioned rubber hose coupling 159 to hydraulic insulator 160. The heat shield section 123 has coils 167 and 168 with conduits 169 and 170, conduit 170 being shown connected to the hydraulic insulator 160 at coupling member 159.

Particular reference is made now to FIG. 5, a detailed cross-sectional view through the hose coupling 159. It is seen that a connector plug 162 composed of electrically insulating material has six spaced circular passageways therethrough for the passage of the ends of conduits 157, 158, and 123. It is noted that the inner shield 122 of somewhat greater diameter than the others overlaps the inner ends of the adjacent shield portions 121 and 123 to insure that the "line of sight" from the arc does not reach the tie bar 126, and other tie bars at spaced intervals around the coils. The aforementioned field coils 149 and 150 are energized as desired to set up a field of the desired strength and direction. In FIG. 3 the supporting means 174 and 175 are provided for the hydraulic insulators.

As in the case of the embodiment of FIG. 1, the annular arc starting member 177 is moved in response to movement of rod 178 until it makes contact with electrode 145, and an arc is started. The arc starting member 177 is then drawn back to the position shown, and the arc transfers to electrode 146, whereafter member 177 becomes neutral or "floating."

In the embodiment of FIG. 3, the coil portion 122 of the heat shield assembly may be made of sufficiently greater diameter than the coil portions 121 and 123 so that it is no longer necessary to insulate the coils of any one portion from each other, because the impedance of the strike distance path between electrodes by way of coil portions 121–122–123 can be made large enough due to the combined air gaps between coil portions 122 and 121 and between 122 and 123, that the arc will not follow a path between electrodes by way of the coils of the heat shield.

Figure 8:
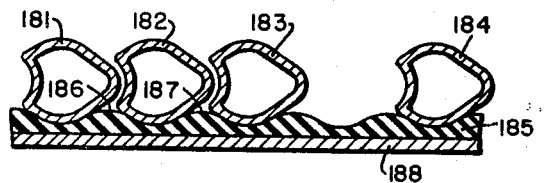
FIG. 8 is a detailed cross-sectional view of a suitable coil and tongue arrangement utilizing supporting and spacing means for the coil composed of insulating material.
Figure 7:
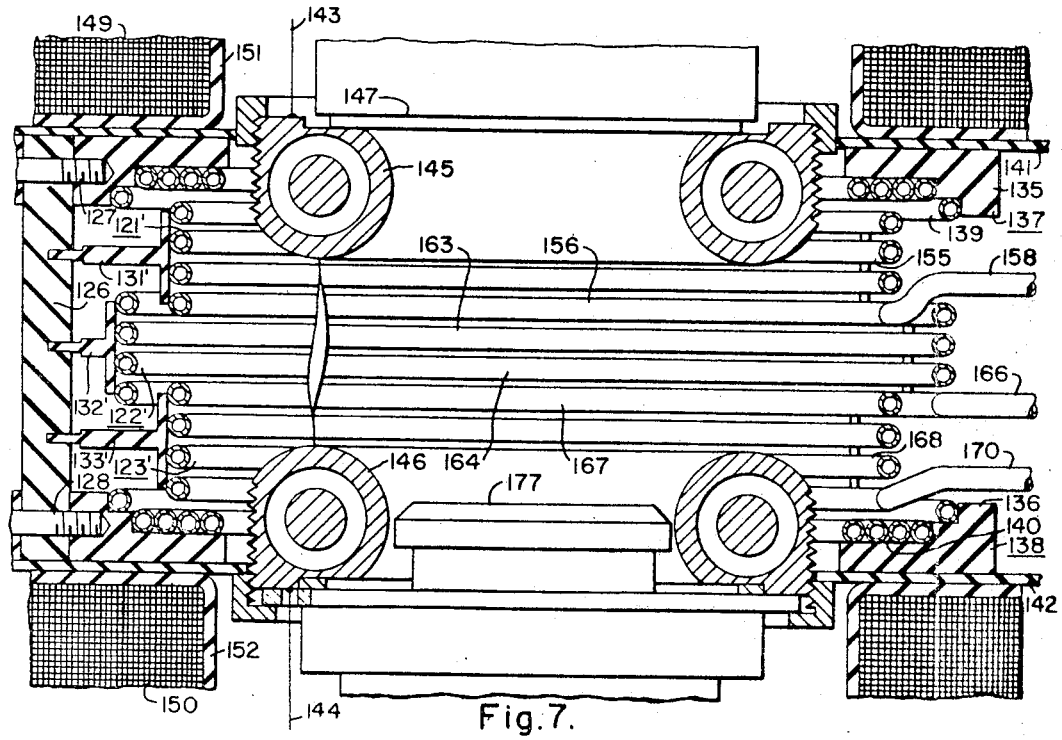
FIG. 7 is a cross-sectional view of apparatus similar to FIG. 3, to a larger scale, and showing spaced coils.

Particular reference is made now to FIG. 8, showing a detailed fragmentary view of a coil support suitable for use in the embodiments of FIGS. 6 and 7. Coils or turns of copper tubing 181, 182, 183 and 184 are irregular in shape and have extended annular tongue portions on one side and indented or recessed annular portions on the other. The tongue portions overhang ridge portions 186 and 187 of insulating support 185 165, 166, 169 and 170. Connector 162 is preferably of the same diameter as hydraulic insulator 160 and is maintained secured thereto by a length of rubber hose and a metallic clamp therearound. The insulating connector plug 162 maintains electrical insulation between the three heat shield sections 121, 122, and 123.

Two hydraulic insulators 160 and 160', and two connectors may be used at 162 instead of one, each connected to three conduits.

Air may if desired enter the arc chamber formed between the electrodes and within the heat shield through the spaces between heat shield portion 121 and the ring assembly 137, and also the space between heat shield portion 123 and the ring assembly 138. Air or other gas to be heated may also enter between shield portion 122 and portions 121 and 123.

Member 177 is a movable arc starter element, under the control of rod 178.

Particular reference is made now to FIG. 7, showing in larger scale a portion of another embodiment of the apparatus, in which there is spacing between the coils of each heat shield section. The heat shield sections 121′, 122′, and 123′ are supported by cylindrical supports 131′, 132′ and 133′ composed of insulating material.

It is seen then that the embodiments of FIGS. 3, 6 and 7 also accomplish the aforedescribed objects of the invention, which are to provide an arc chamber with walls forming a heat shield between the area where the arc is produced and the walls of a containing vessel or tank, so that direct radiation from the arc does not fall on any metallic or non-metallic portion of the apparatus which is not directly cooled by cooling fluid. The line of sight from the arc between electrodes 145 and 146 at all times falls upon either the coils 139 or 140 or upon the heat shield portions 121, 122 backed by metallic support 188. The tongues prevent direct radiation from the arc from reaching the insulating material which supports and spaces the turns of the coil or coils in electrically insulated relationship to each other. Member 188 may have a flange and be supported by tie bars.

There has been provided then apparatus well suited to accomplish the objects of our invention, by providing a cooled heat shield for an arc chamber and thereby providing an arc chamber in which arc energy of increased power may be employed to heat gases to temperature values heretofore unattainable in prior art equipment.

Whereas we have shown and described our invention with respect to the use of a magnetic field to cause the arc to move continuously over the faces of the electrodes, it will be understood that our heat shields are not limited to such apparatus, but are applicable to an arc heater using, for example, a rotating electrode or electrodes.

The coils of this invention are not limited to round coils, but the coils may be square or have any desired shape.

Members 111, 112, 48 and 78, and corresponding members in other embodiments are composed of non-magnetic material.

Any convenient means, in addition to those shown, may be connected to the electrodes for bringing electrical current thereto.

It is understood that all of the embodiments of the invention include gas inlet means for admitting air or other gas to be heated through a cover plate or through the wall of the tank to the chamber formed between electrodes and partially enclosed by the heat shield. Gas passes into the arc chamber between electrodes through the spaces between the sections or coils of the heat shield, and the spaces between the heat shield and the electrode ring assembles.

In some applications, where the gas is to be heated to a relatively low temperature, some partial exposure of a cylindrical support member such as 112′, composed of ceramic or other insulating material, to radiation from the arc may be tolerated.

The drawings and the foregoing written description are exemplary only and are not to be interpreted in a limiting sense.

We claim as our invention:

1. Arc heater apparatus comprising, in combination, means forming an arc chamber, a pair of spaced electrodes disposed in said chamber, at least one of the electrodes being insulated from the chamber forming means, means for admitting gas under pressure to the space between the electrodes, means for conducting gas from the chamber after heating by the arc between the electrodes, and heat shield means substantially enclosing the space between the electrodes and preventing direct radiation from the arc between electrodes from reaching the wall of the chamber forming means, the heat shield means including a plurality of coils of hollow tubing composed of a heat conductive material, means for supporting the coils in predetermined positions with respect to each other, the coils being electrically insulated from each other, and fluid means connected to the coils for bringing a cooling fluid to the coils and for conducting the fluid from the coils while maintaining the electrical insulation between the coils.

2. Arc heater apparatus according to claim 1 in which the heat shield means is additionally characterized as consisting of at least first, second and third sections spaced from each other and positioned in that order between electrodes, each section consisting of at least one coil, the coil of the second and middle section being of greater diameter than the coils of the first and third sections adjacent the spaced electrodes, the sections being so arranged that the second section overlaps the adjacent ends of the first and third sections.

3. Arc heater apparatus according to claim 1 including in addition means for setting up a magnetic field of predetermined strength and direction in the space between electrodes.

4. Arc heater apparatus according to claim 1 wherein the coils of the heat shield means are additionally characterized as being in substantial axial alignment with each other.

5. Arc heater apparatus comprising, in combination, means forming an arc chamber, a pair of spaced electrodes disposed in said chamber, at least one of the electrodes being insulated from the chamber forming means, means for admitting gas to be heated to the space between the electrodes, means for conducting heated gas from the chamber, and heat shield means at least partially enclosing the space between the electrodes and at least partially preventing direct radiation from the arc between electrodes from reaching the inner wall of the chamber forming means, the heat shield means including at least one coil of hollow tubing, means for supporting the coil in the chamber while electrically insulating the coil from the chamber and from both the electrodes, and fluid means connected to the coil for bringing a cooling fluid to the coil and conducting fluid from the coil while maintaining the electrical insulation of the coil, the impedance of the striking distance between electrodes by way of the coil being substantially greater than that of the striking distance directly between electrodes.

6. Arc heater apparatus according to claim 5 including in addition means for setting up a magnetic field in the space between the electrodes.

7. Arc heater apparatus according to claim 5 wherein the means for conducting heated gas from the chamber is a nozzle extending through the wall of the chamber forming means and having the inner end thereof adjacent one of the electrodes.

8. Arc heater apparatus according to claim 5 including in addition movable arc starter means.

9. Arc heater apparatus according to claim 5 wherein the coil is additionally characterized as being substantially axially aligned with the axis between electrodes and has a greater inside diameter than the outside diameter of the electrodes.

10. Apparatus according to claim 5 in which the supporting means for the coil includes a cylindrical support member composed of insulating material, the support member supporting the coil and spacing the turns thereof from each other.

11. Arc heater apparatus comprising, in combination, housing means, first and second spaced electrodes disposed in the housing means, an exhaust nozzle for exhausting gas from the housing means and having one end thereof adjacent the first electrode, means in the housing means for setting up a magnetic field in predetermined position with respect to the electrodes, means for admitting gas to be heated to the space between electrodes, heat shield means for preventing direct radiation from the arc between electrodes from striking the inner wall of the housing means, the heat shield means including a plurality of coils of hollow tubing composed of a heat conductive material, each of the coils being insulated from adjacent coils on both sides thereof, the coils having substantially the same diameter and being substantially axially aligned, means including hydraulic insulator means for bringing cooling fluid to the coils, and means including other hydraulic insulator means for conducting fluid from the coils.

12. An arc heater apparatus having chamber forming means and having a pair of spaced electrodes disposed in the chamber, at least one of the electrodes being insulated from the chamber forming means, the spaced electrodes being mounted in predetermined positions in the chamber and having means for bringing a current to the electrodes, the apparatus including gas inlet means, gas outlet means, and means for setting up a magnetic field having a predetermined strength and direction between the electrodes, heat shield means at least partially enclosing the space between the electrodes and preventing direct radiation from the arc between electrodes from reaching the wall of the chamber forming means, the heat shield means comprising a plurality of coils of similar diameter each wound of hollow conduit composed of a material having a high heat conductivity, means for supporting the coils in predetermined axially aligned position in the chamber, each coil being electrically insulated from the adjacent coils on both sides thereof, the inside diameter of the coils being greater than the outside diameter of the spaced electrodes, and fluid inlet and outlet means including hydraulic insulators for bringing a cooling fluid to and from the coils of the heat shield means, the cooling fluid having a very low electrical conductivity.

13. Arc heater apparatus comprising, in combination, means forming a housing, first and second spaced electrodes disposed in the housing in fixed position therein, at least one of the electrodes being insulated from the housing, exhaust nozzle means having one end thereof adjacent one of the electrodes, means for setting up a magnetic field in the housing in predetermined position with respect to the electrodes, and heat shield means in the housing at least partially enclosing the electrodes and at least partially enclosing the space between electrodes for preventing at least a portion of the direct radiation from an arc between the electrodes from reaching the inside wall of the housing, supporting means for the heat shield means, the heat shield means including at least first, second and third coil assemblies, the first and third coil assemblies being adjacent the electrodes and each enclosing a portion of the adjacent electrode therein, the second coil assembly being of greater diameter than that of the first and third coil assemblies, the ends of the second coil assembly overlapping at least partially the adjacent ends of the first and third coil assemblies, each of the coil assemblies being composed of at least two coils of substantially the same diameter electrically insulated from each other to discourage the arc striking a path through the coils, the coils being composed of hollow conduit and of a material having a high heat conductivity, fluid conduit means including hydraulic insulator means for bringing a cooling fluid to the coils while maintaining the electrical insulation between the coils, and other fluid conduit means including other hydraulic insulator means for conducting fluid from the coils, the coils preventing direct radiation from the arc from reaching the walls of the chamber and the supporting means, gas to be heated being admitted to the space between electrodes by passing between the coils and the electrodes.

14. Arc heater apparatus comprising, in combination, means forming an arc chamber, first and second electrodes mounted in the chamber in fixed position therein and insulated from each other, each of the first and second electrodes including a spiral groove extending therearound for passing a cooling fluid through the electrode, nozzle means mounted in the chamber and having one end adjacent one of the electrodes, a heat shield composed of a plurality of coils of hollow tubing, the coils being mounted in axially aligned positions between the electrodes, the diameter of the coils being greater than the diameter of the electrodes, the coils being sufficient in number to cause the heat shield to overlap at least a portion of each electrode, means including hydraulic insulator means for bringing cooling fluid to the coils, means including other hydraulic insulator means for conducting fluid from the coils, each of the coils being electrically insulated from the adjacent coils on both sides thereof to discourage an arc from striking an arc path through the electrodes, and a pair of cooling electrode ring assemblies for the first and second electrodes respectively disposed around the outsides of the electrodes, each of the ring assemblies including coils of hollow conduit having cooling fluid flowing therethrough and located on the face of the ring assembly adjacent the arc path between electrodes, the ring assemblies together with the heat shield providing that direct radiation from the arc between electrodes impinges only on a surface which is cooled by a cooling fluid flowing therein, gas to be heated being admitted to the space between the electrodes by passing between the ring assemblies and the reat shield.

15. Arc heater apparatus comprising, in combination, means forming an arc chamber, a pair of spaced electrodes located in said chamber and insulated therefrom, means for setting up a magnetic field in the space between electrodes, circuit means for the electrodes for causing an arc therebetween, output nozzle means having one end thereof adjacent one of the electrodes, a first electrode ring assembly including a ring member supporting a substantially flat wound coiled tube carrying a cooling fluid located on the side of the ring member adjacent the arc path between the electrodes, a second ring assembly including an additional ring member disposed around the outside of the other electrode and insulated therefrom, the additional ring member supporting a substantially flat wound coiled tube carrying a cooling fluid on the side of the additional ring member adjacent the arc path between electrodes, and a heat shield disposed between the electrodes, the heat shield consisting of a plurality of coils of hollow tubing carrying a cooling fluid, each coil consisting of at least one turn and being spaced from and electrically insulated from the adjacent coils on both sides thereof to provide a path through the coils and ring assemblies which has a substantially greater strike distance than the distance directly between electrodes, the diameter of the coils of the heat shield being so proportioned with respect to the diameter of the coils of the ring assemblies that substantially all the direct radiation from the arc between electrodes falls on the coils of the ring assemblies and the coils of the heat shield, gas to be heated entering the area between the pair of electrodes through the spaces between the heat shield and the first and second ring assemblies.

16. Arc heater apparatus according to claim 15 including in addition movable arc starting means electrically connected to one electrode, the arc starting means including means adapted to be moved into electrical contact with the other electrode to start the arc and to be thereafter moved to an operating position whereat the arc path is transferred to the one electrode.

17. Arc heater according to claim 15 wherein the electrodes are additionally characterized as having spiral passageways therethrough for the passage of a cooling fluid.

18. Arc heater apparatus comprising in combination, means forming a pressure vessel including means for admitting gas to be heated into the vessel and exhausting heated gas therefrom, a pair of spaced electrodes mounted in the pressure vessel adapted to be connected to terminals of opposite polarity of a source of potential to produce and sustain an arc therebetween, a heat shield within the pressure vessel for protecting the inner wall thereof from radiation from said arc, the heat shield including a first coil composed of a hollow conduit of highly heat conductive material and at least a second coil composed of a hollow conduit of highly heat conductive material, the first coil being spaced from and electrically insulated from the second coil, both the first and second coils having their axes generally parallel to the path of the arc with the arc extending through the coils, means including hydraulic insulator means for bringing cooling fluid to the first coil and to the second coil while maintaining the coils electrically insulated from each other, and means including additional hydraulic insulator means for conducting fluid from the coils after the fluid passes therethrough, the fluid being characterized by low electrical conductivity.

19. Apparatus according to claim 18 in which the hollow conduit is so shaped that there is a groove therein extending substantially the entire circumference of a turn on one side thereof, and a tongue extending substantially the entire circumference of the turn on the other side thereof, each tongue extending into an adjacent groove of an adjacent turn without making electrical contact therewith.

20. In arc heater apparatus of the type having means forming a pressure vessel with means for admitting gas to be heated into the vessel and means for exhausting heated gas from the vessel, and having a pair of axially spaced electrodes in the vessel adapted to be connected to terminals of opposite polarity of a source of potential to produce and sustain in an arc therebetween, the improvement which comprises heat shield means substantially enclosing the space where the arc occurs and preventing substantial radiation from the arc from leaving said space, the heat shield means including a first fluid cooled heat shield section and at least a second fluid cooled heat shield section, the sections being discretely formed and disposed at predetermined axial position with respect to each other, the sections being electrically insulated from each other to discourage the arc from striking to a heat shield section and forming a current path between electrodes which includes said last named heat shield section.

21. Arc heater apparatus according to claim 20 wherein the fluid cooled sections of the heat shield means axially overlap each other, thereby optically shielding adjacent parts of the arc heater apparatus from direct radiation from the arc.

22. Arc heater apparatus according to claim 20 wherein the sections of the heat shield means are additionally characterized as each being composed of at least one turn of hollow conduit having a cooling fluid flowing therethrough.

References Cited

UNITED STATES PATENTS

| | | | |
|---|---|---|---|
| 1,967,696 | 7/1934 | Widmer | 313—12 |
| 1,985,511 | 12/1934 | Marti | 313—12 |
| 2,041,663 | 5/1936 | Marx | 313—35 X |
| 2,428,000 | 9/1947 | Winograd | 313—33 |

JAMES W. LAWRENCE, Primary Examiner

P. C. DEMEO, Asistant Examiner

U.S. Cl. X.R.

313—32, 33, 35, 161, 231